United States Patent [19]

Korpman

[11] 4,389,444

[45] Jun. 21, 1983

[54] NOVEL ALLOY COMPOSITIONS AND PRODUCTS

[75] Inventor: Ralf Korpman, Bridgewater, N.J.

[73] Assignee: Johnson & Johnson, New Brunswick, N.J.

[21] Appl. No.: 254,225

[22] Filed: Apr. 14, 1981

Related U.S. Application Data

[60] Division of Ser. No. 142,692, May 5, 1980, Pat. No. 4,301,255, which is a continuation-in-part of Ser. No. 54,540, Jul. 5, 1979, abandoned.

[51] Int. Cl.³ .............................................. B32B 3/10
[52] U.S. Cl. .................................. 428/137; 428/343; 428/355; 428/480
[58] Field of Search ................ 428/137, 355, 343, 480

[56] References Cited

U.S. PATENT DOCUMENTS

| | | | |
|---|---|---|---|
| 3,909,333 | 9/1975 | Eastman | 156/332 |
| 4,037,016 | 7/1977 | Habeck et al. | 428/355 |
| 4,062,995 | 12/1977 | Korpman | 428/134 |
| 4,101,605 | 7/1978 | Gergen | 525/98 |

*Primary Examiner*—J. Ziegler
*Attorney, Agent, or Firm*—Alice O. Robertson

[57] ABSTRACT

New polymer alloy compositions of a thermoplastic-elastomeric block copolymer and copolyester, and films prepared therefrom are described. The films have superior properties, including resistance to attack by organic solvents.

3 Claims, No Drawings

NOVEL ALLOY COMPOSITIONS AND PRODUCTS

This is a division of application Ser. No. 142,692, filed May 5, 1980, now U.S. Pat. No. 4,301,255, issued Nov. 17, 1980, which in turn is a continuation-in-part of Ser. No. 054,540, filed July 5, 1979, now abandoned.

BACKGROUND OF THE INVENTION

Thermoplastic rubbers which are block copolymers generally known in the art as A-B-A or A-B block copolymers and characterized by having alkenylarene polymer blocks and rubbery blocks of conjugated diene or alkene polymers are known in forming films and other materials normally formed with conventional vulcanized elastomers. Copolyesters which are polyesters characterized by having at least two different ester units and which are condensation products of dicarboxylic acids and aliphatic diols are known in the art in plastic film formation. Although films have been prepared from both the rubbers and the esters, the films have non-analogous properties.

STATEMENT OF THE INVENTION

The invention is directed to a new plastic alloy and to films and tapes produced from the alloy, particularly pressure-sensitive adhesive tapes.

DESCRIPTION OF THE INVENTION

According to this invention, new polymer alloy compositions have been discovered. The new polymer alloy compositions comprise a polymer blend of (a) from about 5 parts to about 95 parts by weight of a thermoplastic-elastomeric block copolymer component consisting essentially of an A-B-A or A-B block copolymer or mixtures thereof as hereinafter more specifically described and (b) correspondingly from about 95 to 5 parts by weight of a copolyester component, said copolyester component consisting essentially of a polycondensation product of a dicarboxylic acid and an aliphatic diol wherein said copolyester is characterized by having at least two different ester units as hereinafter more specifically described.

The novel alloy compositions are suitable for use in numerous applications depending on the relative amounts of the elastomeric block copolymer and the copolyester components and further on the selection of the particular ester or esters or the particular block copolymer or copolymers. The alloy compositions have superior properties which are manifest during manufacture or in the ultimate product. Thus, for example, in the preparation of copolyester films by extrusion, the extrusion process is greatly facilitated and the product improved by substituting for a copolyester, an alloy composition containing as little as 5 percent elastomeric block copolymer. Alloys in which the copolyester is at least 10 percent of the alloy are useful in providing elastomeric materials having resistance to dissolution by organic solvents. Alloys of less than 10 percent copolyester still provide improved elastomer compositions although not completely organic solvent insoluble.

Compositions of alloys of at least equal parts by weight of an elastomeric block copolymer and a copolyester, preferably of major part of a block copolymer and a minor part of a copolyester are elastomeric compositions useful for rubberbands, elastic tape backings, elastic films and sheets, etc. Generally, compositions are from about 50 to about 85 parts by weight of the block copolymer and correspondingly from about 50 to 15 parts by weight of the copolyester. Preferred compositions for additional solvent resistant properties are from about 55 to 75 parts by weight of the block copolymer and correspondingly from about 45 to 25 parts by weight of the copolyester.

Alloys of a major part of copolyester and a minor part of elastomeric block copolymer are primarily plastic compositions useful for the preparation of plastic films, electrical and bandage tapes and the like, where flexibility and softness are desired without high elasticity. Generally, alloy compositions for such use are from about 55 to 95 parts by weight of copolyester and correspondingly from about 45 to 5 parts by weight of the block copolymer. Preferred compositions are from about 65 to 90 parts by weight of copolyester and correspondingly from about 10 to 35 parts by weight of the block copolymer.

In the novel alloys, the thermoplastic-elastomeric block copolymers are those having a thermoplastic block conventionally designated as A blocks and rubbery blocks conventionally designated as B blocks. One suitable group of block copolymers include those having thermoplastic endblocks and rubbery midblocks and designated as A-B-A block copolymers. The expression "A-B-A" block copolymer is intended to embrace all variations of block copolymers with rubbery midblocks and thermoplastic endblocks. Thus, it is intended to embrace copolymers sometimes designated A-B-C block copolymer in which C is also a thermoplastic endblock but of a different polymer than A. It is also intended to embrace linear, branched and radial block copolymers. The radial block copolymers may be designated $(A-B)_n X$ wherein X is a polyfunctional atom or molecule and in which each (A-B) radiates from X in a way that A is an endblock. Another suitable group of block copolymers include those in which B forms one endblock rather than a midblock and which are sometimes referred to as "A-B" or "simple" block copolymers. The expression "block copolymer" without qualification is intended to embrace both A-B-A and A-B type of copolymers.

The thermoplastic "A" block is generally a polymer of alkenylarenes, preferably of styrene or styrene homologs and analogs such as α-methylstyrene, 5-tertiary-butylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene vinyltoluene and the like.

The rubbery "B" block is a polymer of a conjugated lower aliphatic diene of from 4 to about 6 carbon atoms. Suitable conjugated dienes include butadiene, isoprene, 1,3-pentadiene, 1,3-hexadiene, 2,3-dimethylbutadiene and the like. The preferred dienes are butadiene and isoprene.

In the radial block copolymer, $(A-B)_n X$, X may be an organic or inorganic polyfunctional atom or molecule and n is an integer have the same value as the functional group originally present in X. It is usually at least 3 and is frequently 4 or 5 but is not limited thereto. In addition, it embraces a more complex radial block copolymer system disclosed in the article, "New Rubber is Backed by Stars," appearing in Chemical Week, June 11, 1975, page 35.

Suitable thermoplastic rubber block copolymers are prepared by stepwise solution polymerization of the components. The preparations and properties of block copolymers are amply described in the literature such as, for example, "Thermoplastic Rubber (A-B-A Block Copolymers) in Adhesives" by J. T. Harlan et al., in "Handbook of Adhesives" edited by Irving Skeist, Van Nostrand Reinhold Co., New York, Second Edition (1977), pages 304–330; "Rubber-Related Polymers, I. Thermoplastic Elastomers" by W. R. Hendricks et al., in "Rubber Technology" edited by Maurice Morton, Van Nostrand Reinhold Co., New York (1973), pages 515–533; and U.S. Pat. Nos. 3,321,635; 3,519,585; 3,787,531; and 3,281,383; and for A-B block copolymers, U.S. Pat. Nos. 3,519,585 and 3,787,531.

In the suitable block copolymers, the individual "A" block portion has a number average molecular weight of at least 6,000, preferably in the range of from about 8,000 to 30,000, and the "B" block portion has a number average molecular weight preferably in the range of from about 45,000 to about 180,000. The "A" blocks constitute from about 5 to about 50 percent, preferably about 10 to about 30 percent by weight of the block copolymer. The number average molecular weight of the block copolymer is preferably in the range of about 75,000 to 200,000 for linear copolymers and preferably in the range of about 125,000 to 400,000 for radial copolymers.

When the "A" block is polystyrene and the "B" block is a polymer of butadiene, the polymer may be referred to as an S-B-S or S-B polymer, and when the "A" block is a styrene polymer and the "B" block is an isoprene polymer, the polymer may be referred to as an S-I-S or S-I polymer. Many of the block copolymers are obtainable commercially under trade names such as Kraton ® 1102 and 1107 (both linear Shell Chemical Co.), Solprene ® 418 and 420 (both radial), and Solprene ® 311X and 1205 (both simple; Phillips Petroleum Co.).

The copolyester component of the alloy consists essentially of a copolyester polymer of at least two identifiable ester units, which may be represented by the formulas

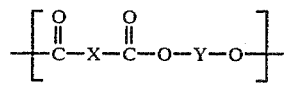

and

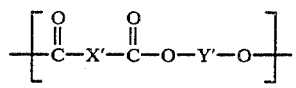

wherein X and X' are nuclei of dicarboxylic acids and Y and Y' are nuclei of aliphatic diols. In the copolyester polymer the ester units are present in such amounts as to confer to the polymer the desirable physical properties hereinafter enumerated. The different ester units may arise from the condensation of (a) two different acids with the same diol, (b) two different diols with the same acid, or, (c) two different acids and two different diols. In the latter case, four different ester units would be possible. By "copolyesters" is meant to include random and segmented copolyesters. By "random" is meant that the ester units are not usually in a definite pattern such as in alternating units or in having a homopolymer of one ester unit joined terminally to a homopolymer of a second ester unit. By "segmented" is meant that there is a polymer block of a given ester unit joined to a polymer block of another ester unit through an ester linkage.

Generally, one ester unit of the copolyester is highly crystalline and one substantially less crystalline or even non-crystalline.

Among the aromatic and aliphatic dicarboxylic acids suitable in the copolyester are terephthalic acid, isophthalic acid, oxalic acid, maleic acid, succinic acid, glutaric acid, adipic acid, suberic acid, azelaic acid, sebacic acid, and the like.

The aliphatic diols useful in the polyester include ethylene glycol, 1,3-propylene glycol, diethylene glycol, dipropylene glycol, butylene glycol, tetramethylene glycol, trimethylene glycol and the like. Preferred aliphatic diols are straight chain alkylene diols having from 2 to 4 carbon atoms.

Representative copolyesters may be mentioned the following: poly(ethylene terephthalate-co-ethylene azelate), poly(ethylene terephthalate-co-butylene adipate), poly(ethylene terephthalate-co-1,2-propylene terephthalate), poly(butylene terephthalate-co-butylene isophthalate), poly(ethylene terephthalate-co-ethylene sebacate), poly(ethylene terephthalate-co-tetramethylene terephthalate), poly(ethylene terephthalate-co-ethylene adipate), poly(ethylene terephthalate-co-trimethylene terephthalate), and the like, including polyesters described on pages 77–80 of "Encyclopedia of Polymer Science and Technology," Vol. 11, John Wiley and Sons (1977). Random copolyesters are frequently identified in the literature not according to ester units but according to the relative amounts of the components of the ester. Thus, for example, in U.S. Pat. No. 3,699,189, there is found described copolyesters in which the component acids are terephthalic acid and sebacic acid, and the component diols are ethylene glycol and neopentyl glycol, which are said to be esters in which the terephthalic acid units can range from 20 to 75 percent and the sebacic acid units can range from 80 to 25 percent of the total acid units, and the ethylene glycol units can range from 40 to 60 percent and neopentyl glycol units can range from 60 to 40 percent of the total diol units. The patent further teaches other copolyesters which also are described in terms of the amounts of the diols or dicarboxylic acids which make up copolyester. Representative suitable copolyesters are available commercially under VPE designations from Goodyear Tire & Rubber Company and under KODAR ® designations from Fastman Chemical Company.

Copolyesters suitable for use in the alloy compositions of this invention may be made by conventional condensation polymerization procedures employing appropriate modification depending on the ultimate product desired. One general method is direct esterification employing dicarboxylic acids or conventional acid derivatives such as esters, halides, etc., with diols usually at high temperatures and long reaction times. The temperature is usually in the range of about 150° to 250° C., but sometimes as high as 280° C. at which temperatures reaction occurs with formation of the ester polymer. The reaction is usually carried out with excess diol to compensate for the loss of diol which is removed by distillation with the liberated water. Conventional catalysts may be employed, if desired.

An alternative method is ester interchange, either alcoholysis or acidolysis, employing diols with dicarboxylic acid diesters or employing of the diol diesters with dicarboxylic acids. Preferably, an alcoholysis is employed which may be carried out by heating together a dicarboxylic acid diester with excess diol usually with a basic catalyst in an inert atmosphere until evolution of alcohol is complete.

These and other methods of syntheses can be found in the Encyclopedia of Polymer Science and Technology, Vol. 11, pages 88–113.

For segmented copolyesters a step-wise application of the general methods may be employed. Segmented copolyesters are conventionally prepared by an ester interchange reaction. In one procedure, a low molecular weight alkyl diester of one or more dicarboxylic acid is heated with an appropriate long chain and excess short chain diol in the presence of catalyst at about 150° to 200° C. with the distillation of the low molecular weight alcohol formed in the interchange. Heating is continued until the alcohol evolution is complete to obtain a very low molecular weight prepolymer which can be converted to high molecular weight segmented copolyester by heating the prepolymer with a long chain diol and distilling off excess short chain diol preferably at reduced pressures and elevated temperatures in the presence of antioxidants. Preparations particularly suitable for segmented copolyesters may be found in U.S. Pat. Nos. 3,832,314 and 3,932,326.

The copolyesters which are useful in the novel alloy compositions normally possess a thermal softening temperature below about 225° C. (437° F.). The preferred copolyesters have an extrusion temperature within the range from about 325° to about 425° F. Suitable polyesters may be characterized by a torque property which can be measured by working in a recording torque dynamometer (Plasti-Corder ® EPL-V750 manufactured by C. W. Brabender Co., Hackensack, N.J.). When worked at 75 r.p.m. at 420° F. using a REE 6 mixing head, suitable polyesters have a torque value of less than about 1000 meter grams. The preferred polyesters exhibit a torque value in the range from about 200 to about 700 meter grams at this temperature. These values may be converted to poises by employing the following formula $$\frac{\text{torque} \times 388}{\text{r.p.m.}} = \text{poise}$$

Thus, when expressed in poises, the esters should show torque properties of less than about 5200 poises, preferably about 1000 to 3600 poises. Generally the copolyesters having the foregoing suitable properties are in the number average molecular weight range of about 20,000 to 200,000, preferably about 30,000 to 75,000.

The films and sheets both those which are primarily elastic and those which are primarily plastic may be prepared from the new alloy compositions. For the films and sheets the compositions may be modified with minor amounts of antioxidants, such as 2,5-ditertiary-amylhydroquinone, zinc salts of alkyl dithiocarbamates; and fillers and pigments such a zinc oxide, titanium dioxide, calcium carbonate, etc. The resulting films and sheets exhibit high flexibility and low solubility in commonly used organic solvents. Further, the films are sealable by application of heat, ultrasonic or other forms of energy.

The films of the new alloy compositions may be prepared by several of the conventional methods. The most convenient method is extrusion in which an extruder may be employed for both compounding and film formation. In this method the components are placed in the extruder and extruded at temperatures in the range of from about 300° to 440° F. and drawn to form a film.

Another method is hot melt coating, in which the components are mixed in a heated kettle or extruder in the range 300° F. to about 450° F., and the melted mixture pumped into a die and coated onto a temporary backing, such as a silicone coated release paper backing. The third method is high temperature calendering in which the components are mixed at elevated temperatures (about 300° F. to 450° F.) in either a twin screw extruder or a Banbury mixture, fed into a heated calendering mill, and calendered into a film of desired thickness.

The films from the new alloy compositions are adapted to be employed as backing for tapes, particularly pressure-sensitive adhesive tapes, and the novel tapes produced thereby constitutes an aspect of the present invention. Depending on the intended use of the tape, elastomeric compositions or plastic compositions hereinbefore described are selected for use.

When it is desired to have elastic pressure-sensitive adhesive tapes, the elastomeric compositions previously described are employed. The elastic pressure-sensitive tape comprises a flexible thermoplastic-elastic backing film and coated thereon, a layer of a normally tacky pressure-sensitive adhesive. The backing film is formed from an elastomeric thermoplastic film forming composition preferably comprising (a) from about 55 to about 75 parts by weight of an elastomeric block copolymer component, said block copolymer consisting essentially of an A-B-A or A-B block copolymer or a mixture thereof, in which A represents an alkenylarene polymer block and B represents a polymer block of a conjugated lower aliphatic diene or a lower aliphatic alkene, and (b) correspondingly from about 45 to about 25 parts by weight of a copolyester, said copolyester being a polymer of at least two different ester units, each unit being a condensation product of a dicarboxylic acid and an aliphatic diol.

When it is desired to have tape which is flexible and soft but not elastic such as in bandage tapes or in tapes suitable for wrapping electrical wires, the compositions previously described as substantially plastic compositions are employed. The plastic pressure-sensitive tape comprises a flexible thermoplastic backing film and coated thereon, a layer of a normally tacky pressure-sensitive adhesive. The backing film is formed from a plastic film forming composition, preferably comprising (a) from about 65 to about 90 parts by weight of the copolyester said copolyester being a polymer of at least two different ester units, each unit being a condensation product of a dicarboxylic acid and an aliphatic diol and (b) correspondingly from about 35 to 10 parts by weight of an elastomeric block copolymer component consisting essentially of an A-B-A or A-B block copolymer or a mixture thereof wherein A represents an alkenylarene polymer block and B represents a polymer block of a conjugated lower aliphatic diene.

In the preparation of pressure-sensitive tapes, a film from the compositions above-described and prepared as previously described is coated with a pressure-sensitive adhesive. A suitable pressure-sensitive adhesive is one which is normally tacky and may be a conventional rubber resin adhesive as disclosed in U.S. Pat. No. 2,909,278, or an adhesive based on an A-B-A block copolymer which have tackifying resins which associate with the B block as disclosed in U.S. Pat. Nos. 3,676,202 or 4,024,312. One preferred adhesive is one based on a blend of (a) thermoplastic elastomeric block copolymers in which the major portion is 55 to 85 parts by weight of an A-B block copolymer and a minor portion is 15 to 45 parts by weight of an A-B-A block copolymer and (b) tackifier resin wherein the resin is employed in the amount of from about 50 to 150 parts for every 100 parts of thermoplastic elastomeric block copolymer. Suitable block polymers include those previously defined in connection with the alloy component. Suitable resins are solid or liquid resins such as those described in U.S. Pat. No. 4,080,648 and the teachings of this and the preceding patents are incorporated by reference. The adhesives may be a hot melt extrusion or solvent coatable adhesives. Examples of such adhesives may be found in "Pressure-Sensitive Adhesives, Formulations and Technology," Henry R. Dunning, Noyes Data Corporation, 1977; or in "Handbook of Adhesives," edited by Irving Skeist, Van Nostrand Reinhold Company, pp. 724–735, and the references contained therein. In addition to the foregoing, the adhesive may be based on a blend of a thermoplastic-elastomeric block copolymer, a copolyester and a tackifier resin as disclosed and claimed in copending application Ser. No. 054,541 entitled "Adhesive Compositions" in the name of Ralf Korpman, filed concurrently herewith, abandoned in favor of application Ser. No. 142,691, filed May 5, 1980, now U.S. Pat. No. 4,294,936, issued Oct. 13, 1981.

In the foregoing adhesive compositions the amount of tackifier resin has been expressed as an amount for every 100 parts of the thermoplastic-elastomeric block copolymer. This method of expression is used in rubber compositions in which resin or other additive is expressed in terms of an amount per 100 parts of rubber. In the present alloy compositions of the elastomeric or plastic film, the amount of copolyester may also be expressed in terms of 100 parts of block copolymer as rubber. However, in view of the fact that this invention is directed to new alloys which is not necessarily predominantly rubber and in which the percent amounts of the components is more meaningful, the relative amounts based on 100 percent have been employed. These amounts may readily be converted to parts of copolyester per 100 parts of rubber, if desired, by the skilled in the art.

The novel alloy compositions are suitable not only for preparing conventional films but also for preparing films modified in physical appearance such as embossed films, and further are adaptable to be employed in preparing reticular webs, i.e., oriented and unoriented intersecting strands or filaments which form a net-like open porous structure. The strands of this web may be molecularly oriented as by stretching and heat setting, or they may be generally non-oriented. Non-oriented reticular webs may be produced by molding or heat-shaping polymeric films of the above-described elastomeric and plastic film-forming compositions to form the network of intersecting strands. Preferred processes to accomplish this are described in U.S. Pat. Nos. 3,632,269 and 3,666,609. The reticular web resulting from this molding-type operation may be used in the non oriented form as molded, or the molded web may be subjected to subsequent steps to stretch the intersecting strands in one or more directions. In general, the strands are stretched in machine direction by means such as speedup rollers, and in the cross-direction by means such as tenter frame or the like. The extent of drawing or stretching may be as high as 6 to 1 or more. Sufficient heat must at least be applied by the strands are held in their newly stretched configurations to heat-set the web in stretched condition. Preferably, the newly molded web is stretched while still hot or at least heated during stretching and to some extent after stretching to provide the necessary heat setting. Alternatively, the molded web may be cold-stretched and then heated after stretching to set the stretched oriented web.

The following examples illustrate the invention but are not to be construed as limiting:

EXAMPLE I

In separate operations, a S-I-S block copolymer elastomer (Kraton ® 1107 Shell Chemical Company) and a poly(ethylene terephthalate-co-ethylene azelate) copolyester composition of apparent molecular weight about 20,000 (obtained as VPE 5571, Goodyear Tire & Rubber Co.) are employed to produce alloy compositions having weight ratios of elastomer to copolyester of 50:50, 60:40, 70:30; 80:20 and 90:10. In separate operations the compositions are blended in an extruder, extruded and hot drawn at about 400° F. to obtain elastomeric films of about 5 mils in thickness. Unmodified S-I-S block copolymer is also extruded and hot drawn in a similar manner. The properties of the films are then determined. Tensile strength and elongation are determined by preparing 1 inch×5 inch strips of the film and measuring, employing ASTM D1000 test method for tapes. The solubility is determined by placing a 1 inch×2 inches film strip in toluene as a representative organic solvent and observing for solubility. Modulus to tensile stress in pounds per square inch of initial cross-section measured at one-half inch extension per inch of 100 percent or 500 percent elongation. Percent elastic recovery is the present immediate recovery after 500 percent elongation. The results seen in Table I show that copolyester modified elastomeric films of Compositions I–V have the combined superior properties of good elongation, greatly increased tensile strength, increased modulus, and very little or no solubility in organic solvents.

TABLE I

|  | COMPOSITION | | | | | Unmodified Elastomer |
|---|---|---|---|---|---|---|
|  | I | II | III | IV | V |  |
| Elastomer (Percent) | 50 | 60 | 70 | 80 | 90 | 100 |
| Copolyester (Percent) | 50 | 40 | 30 | 20 | 10 | — |
| Film Thickness (mils) | 5.1 | 5.1 | 5.0 | 5.1 | 5.1 | 5 |
| Elongation (Percent) | 1265 | 1365 | 1250 | 1470 | 1470 | 1600 |
| Tensile Strength (p.s.i.) | 843 | 1000 | 1540 | 1059 | 961 | 520 |
| Toluene Solubility | Insol. | Insol. | Insol. | Insol. | Sl.Sol. | Sol. |

TABLE I-continued

| | COMPOSITION | | | | | Unmodified |
|---|---|---|---|---|---|---|
| | I | II | III | IV | V | Elastomer |
| 100% Elongation | | | | | | |
| Modulus (p.s.i.) | 176 | 157 | 140 | 118 | 118 | 100 |
| 500% Elongation | | | | | | |
| Modulus (p.s.i.) | 902 | 608 | 440 | 440 | 294 | 200 |
| Percent Recovery (elastic) | 82 | 86 | 88 | 90 | 92 | 95 |

EXAMPLE II

In similar separate operations, the same poly(ethylene terephthalate-co-ethylene azelate) and the same S-I-S block copolymer used in Example I are employed to produce alloy compositions richer in the ester component for producing substantially plastic films. The ratios of copolyester to elastomer are 90:10, 80:20, 70:30 and 60:40. In separate operations, the alloy compositions as well as unmodified copolyester are extruded and hot drawn, and their properties determined as described in Example I. The results seen in Table II show that block-copolymer modified copolyester plastic films have greatly improved elongation and tensile strength while maintaining the desirable properties of the plastic copolyesters.

TABLE II

| | COMPOSITION | | | | Unmodified Copolyester |
|---|---|---|---|---|---|
| | VI | VII | VIII | IX | |
| Copolyester (Percent) | 90 | 80 | 70 | 60 | 100 |
| Elastomer (Percent) | 10 | 20 | 30 | 40 | — |
| Film Thickness (mils) | 8 | 4.9 | 5.0 | 5.0 | 5 |
| Elongation (Percent) | 1485 | 1535 | 1330 | 1395 | 825 |
| Tensile Strength (p.s.i.) | 1512 | 2674 | 2600 | 1500 | 1600 |
| Toluene Solubility | Insol. | Insol. | Insol. | Insol. | Insol. |
| 100% Elongation | | | | | |
| Modulus (p.s.i.) | 375 | 592 | 560 | 280 | 640 |
| 500% Elongation | | | | | |
| Modulus (p.s.i.) | 1000 | 1020 | 1220 | 1000 | 1600 |
| Percent Recovery | 78 | 80 | 80 | 82 | 78 |

EXAMPLE III

In a similar operation, a S-I-S block copolymer elastomer (Kraton® 1107) and a poly(butylene terephthalate-co-butylene isophthalate) copolyester composition of apparent number average molecular weight about 1600, (obtained as VPE 4709, Goodyear Tire & Rubber Co.) are blended to produce an alloy of 70 percent by weight of elastomer to 30 percent by weight of copolyester, and the alloy extruded and hot drawn to produce an ester-modified elastomeric film. A film is also produced from unmodified S-I-S block copolymer. The properties of the films so prepared are determined as previously described. The results seen in Table III show greatly improved tensile strength as well as greatly improved modulus on both 100 percent and 500 percent elongation.

TABLE III

| | COMPOSITION X | Elastomer Control |
|---|---|---|
| Elastomer | 70 | 100 |
| Copolyester | 30 | — |
| Film Thickness (mils) | 5 | 5 |
| Tensile Strength (p.s.i.) | 1520 | 520 |
| 100 Percent Elongation | | |
| Modulus (p.s.i.) | 420 | 100 |
| 500 Percent Elongation | | |
| Modulus (p.s.i.) | 1120 | 200 |
| Percent Recovery | 60 | 95 |

EXAMPLE IV

Employing the same copolyester and elastomer of Example III in ratios of copolyester to elastomer of 90:10, 70:30 and 50:50, films are produced as previously described and the properties compared with a film from unmodified copolyester. The results seen in Table IV show that elastomer modified copolyester films have improved tensile strength while retaining the desirable properties of a plastic film.

TABLE IV

| | COMPOSITION | | | Unmodified Copolyester |
|---|---|---|---|---|
| | XI | XII | XIII | |
| Copolyester | 90 | 70 | 50 | 100 |
| Elastomer | 10 | 30 | 50 | — |
| Film Thickness (mils) | 5.6 | 5.2 | 5.0 | 5.5 |
| Elongation (Percent) | 780 | 705 | 720 | 750 |
| Tensile Strength (p.s.i.) | 4232 | 3308 | 3600 | 3455 |
| 100% Elongation | | | | |
| Modulus (p.s.i.) | 1036 | 1250 | 1300 | 1091 |
| 500% Elongation | | | | |
| Modulus (p.s.i.) | 2607 | 2769 | 2640 | 4545 |
| Percent Recovery | 8 | 8 | 8 | 8 |

EXAMPLE V

An elastic backing film is prepared from the following extrudable composition

| Poly(ethylene terephthalate co-ethylene azelate) | 75 parts |
|---|---|
| S-I-S block copolymer (m.w. about 125,000) | 100 parts | by extruding and hot drawing the composition at 400° F. to obtain an elastic film of about 8 mils in thickness. The ratio of elastomer to ester in the composition is about 57/43. Physical properties are determined on a film of 1 inch width as previously described. The results are as follows:

| 100% Elongation Modulus | 280 p.s.i. |
|---|---|
| Tensile Strength | 1500 p.s.i. |
| Percent Elongation | 2000 + |

The film also shows resistance to solvent attack.

The cooled film is extrusion coated with the following pressure-sensitive adhesive composition

| S-I-S linear block copolymer | 20 parts |
|---|---|
| S-I simple block copolymer | 80 parts |
| Polymerized piperylene isoprene solid tackifier resin (m.p. 95° C.) | 90 parts |
| Zinc butyl dithiocarbamate | 2 parts |
| 2,5-Ditertiary-amylhydroquinone | 1 part | and subsequently slit to produce pressure-sensitive adhesive tapes 1 inch wide. The resulting pressure-sensitive adhesive tape shows good elasticity, good strength, resistance to solvent attack as well as adhesive properties: Adhesion to Steel, 100 oz./sq.yd. (180° Peel Adhesion Test PSTC-1 of Pressure-Sensitive Tape Council); Tack, 5(Quickstick as described in U.S. Pat. No. 4,136,071); and Peel Rate at 25° C., zero (test similar to rate of stripping described in U.S. Pat. No. 3,625,752).

The tape may be employed for providing conformability and fit around body members in disposable garments.

EXAMPLE VI

A non-elastic backing film is prepared from the following extrudable composition

| Poly(ethylene terephthalate-co-1,2-propylene terephthalate) | 90 parts |
|---|---|
| S-I-S radial block copolymer (m.w. about 125,000) | 10 parts | by extruding and hot drawing as previously described to obtain a film of about 5 mils in thickness. The film shows good tensile strength and resistance to solvent attack.

The film is extrusion coated with the following adhesive composition

| S-I-S linear block copolymer | 75 parts |
|---|---|
| S-I simple block copolymer | 25 parts |
| Polymerized β-pinene tackifier resin (m.p. 115° C.) | 70 parts |
| Zinc dibutyl dithiocarbamate | 2 parts |
| 2,5-Ditertiary-amylhydroquinone | 0.5 parts | and subsequently slit to produce pressure-sensitive tapes 1 inch wide.

EXAMPLE VII

A film backing suitable for use in adhesive bandages is prepared by extruding the following composition

| Poly(ethylene terephthalate-co-ethylene azelate) | 80 parts |
|---|---|
| Poly(butylene terephthalate-co-butylene isophthalate) | 20 parts |
| S-I-S block copolymer (m.w. about 125,000) | 10 parts |

The extrudate is hot drawn at about 400° F. to obtain a film of about 4 mils. The film shows good tensile strength and resistance to solvent attack.

The cooled film is hot-melt coated with the following pressure-sensitive adhesive composition

| S-I-S linear copolymer | 50 parts |
|---|---|
| S-I simple block copolymer | 50 parts |
| Polymerized piperylene isoprene solid tackifier resin, (m.p. 95° C.) | 80 parts |
| Zinc dibutyl dithiocarbamate | 2 parts |
| 2,5-Ditertiary-amylhydroquinone | 0.5 parts | and subsequently slit to produce adhesive bandage tapes.

EXAMPLE VIII

A plastic film is prepared by extruding at 400° F. and hot drawing an alloy of 90 parts by weight of poly(ethylene terephthalate co-ethylene sebacate) of number molecular weight of about 20,000 and 10 parts by weight of an S-I-S block copolymer of molecular weight of about 125,000. It is found that the film produced is of good quality without the necking which tends to occur when the copolyester unmodified by the block copolymer is extruded and drawn.

EXAMPLE IX

A film backing is prepared by extruding the following composition

| Poly(ethylene terephthalate-co-ethylene azelate) | 75 parts |
|---|---|
| S-I simple block copolymer (m.w. about 110,000) | 25 parts |

The extrudate is hot drawn at about 400° F. to obtain a film of about 5 mils. The film shows good tensile strength and resistance to solvent attack.

I claim:

1. A permanently heat-shaped reticular web which comprises strands intersecting in a pattern and defining a corresponding pattern of holes, said web being formed from an alloy composition comprising
    (a) from about 5 to 95 parts by weight of a thermoplastic-elastomeric block copolymer component, wherein the block copolymer is an A-B-A or A-B block copolymer or a mixture thereof in which A represents an alkenylarene polymer block and B represents a polymer block of a conjugated lower aliphatic diene, and
    (b) correspondingly from about 95 to 5 parts by weight of a copolyester component, wherein the copolyester is a polymeric ester of at least two different ester units, each ester unit being a condensation product of a dicarboxylic acid and an aliphatic diol, said ester units being represented by the formulas

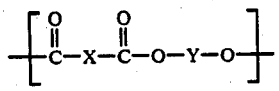

and

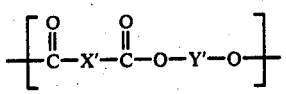

wherein X and X' are nuclei of dicarboxylic acids and Y and Y' are nuclei of aliphatic diols, and the copolyester is characterized by having a thermal softening temperature below about 225° C.

2. An elastic pressure-sensitive adhesive tape which comprises a flexible thermoplastic-elastomeric backing film and coated thereon a layer of a normally tacky pressure-sensitive adhesive, said backing film being formed from an elastomeric thermoplastic film-forming composition comprising
   (a) from about 55 to 75 parts by weight of a block copolymer component wherein the block copolymer is an A-B-A or A-B block copolymer or a mixture thereof in which A represents an alkenylarene polymer block and B represents a polymer block of a conjugated lower aliphatic diene, and
   (b) correspondingly from 45 to 25 parts by weight of a copolyester component, wherein the copolyester is a polymeric ester of at least two different ester units each unit being a condensation product of a dicarboxylic acid and an aliphatic diol, said ester units being represented by the formulas

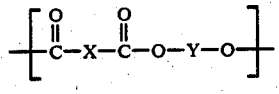

and

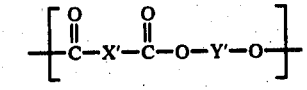

wherein X and X' are nuclei of dicarboxylic acids and Y and Y' are nuclei of aliphatic diols, and the copolyester is characterized by having a thermal softening temperature below about 225° C.

3. A plastic pressure-sensitive adhesive tape which comprises a flexible thermoplastic backing film and coated thereon, a layer of a normally tacky pressure-sensitive adhesive, said backing film being formed from a plastic film-forming composition comprising
   (a) from about 65 to about 90 parts by weight of a copolyester component wherein the copolyester is a polymeric ester of at least two different ester units, each unit being a condensation product of a dicarboxylic acid and an aliphatic diol, said ester units being represented by the formulas

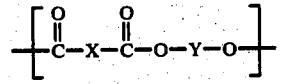

and

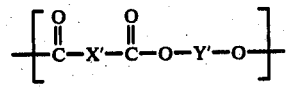

wherein X and X' are nuclei of dicarboxylic acids and Y and Y' are nuclei of aliphatic diols, and the copolyester is characterized by having a thermal softening temperature below about 225° C., and
   (b) correspondingly from about 35 to about 10 parts by weight of block copolymer component wherein the block copolymer is an A-B-A or A-B block copolymer or a mixture thereof in which A represents an alkenylarene polymer block and B represents a polymer block of a conjugated lower aliphatic diene.

* * * * *